US006434585B2

(12) United States Patent
McGregor et al.

(10) Patent No.: US 6,434,585 B2
(45) Date of Patent: Aug. 13, 2002

(54) COMPUTATIONALLY EFFICIENT MODULAR MULTIPLICATION METHOD AND APPARATUS

(75) Inventors: Matthew Scott McGregor, Huntington Beach; Thuan P. Le, Montebello, both of CA (US)

(73) Assignee: Rainbow Technologies, Inc., Irvine, CA (US)

( * ) Notice: Subject to any disclaimer, the term of this patent is extended or adjusted under 35 U.S.C. 154(b) by 0 days.

(21) Appl. No.: 09/758,782

(22) Filed: Jan. 11, 2001

Related U.S. Application Data

(63) Continuation of application No. 09/050,379, filed on Mar. 30, 1998, now abandoned.

(51) Int. Cl.$^7$ .............................................. G06F 7/72
(52) U.S. Cl. .................................................... 708/491
(58) Field of Search ................................ 708/491, 492, 708/501; 380/1, 28, 30, 46; 713/189, 192

(56) References Cited

U.S. PATENT DOCUMENTS

| 5,121,431 A | 6/1992 | Wiener | 380/49 |
|---|---|---|---|
| 5,274,707 A | 12/1993 | Schlafly | 380/30 |
| 5,420,815 A | 5/1995 | Nix et al. | 364/750.5 |
| 5,794,028 A | 8/1998 | Tran | 395/587 |

OTHER PUBLICATIONS

Comba, P.G., "Exponentiation Cryptosystems on the IBM PC", *IBM Systems Journal*, vol. 29, No. 4, Jan. 1, 1990, pp. 526–538.

Bond, Dieter et al., "Optimized Software Implementations of the Modular Exponentiation on General Purpose Microprocessors", *Computers & Security Journal*, vol. 8, No. 7, Nov. 1, 1989, pp. 621–630.

Shand, M. et al., "Fast Implementations of RSA Cryptography", Proceedings of the Symposium on Computer Arithmetic, Windsor, Ontario, 11$^{th}$ Symposium, Jun. 29–Jul. 2, 1993, IEEE, pp. 252–259.

Quisquater, J.J. et al., "Fast Decipherment Algorithm for RSA Public–Key Cryptosystem", *Electronics Letters*, vol. 18, No. 21, Oct. 14, 1982, pp. 905–907.

Koc, Cetin Kaya et al., "Analyzing and Comparing Montgomery Multiplication Algorithms", *IEEE Micro*, vol. 16, No. 3, Jun. 1, 1996, pp. 26–33.

Copy of European Search Report for related European Patent Application No. 98 301 533.0.

*Primary Examiner*—David H. Malzahn
(74) *Attorney, Agent, or Firm*—Foley & Lardner

(57) ABSTRACT

A computationally efficient multiplication method and apparatus for modular exponentiation. The apparatus uses a preload register, coupled to a multiplier at a second input port via a KN bit bus to load the value of the "a" multiplicand in the multiplier in a single clock pulse. The "b" multiplicand (which is also KN bits long) is supplied to the multiplier N bits at a time from a memory output port via an N bit bus coupled to a multiplier first input port. The multiplier multiplies the N bits of the "b" multiplicand by the KN bits of the "a" multiplicand and provides that product at a multiplier output N bits at a time, where it can be supplied to the memory via a memory input port.

2 Claims, 12 Drawing Sheets

| SHIFT NO. | WINDOW VALUE | NET EXPONENTIATION VALUE |
|---|---|---|
| 0 | <u>10</u>11010011 | $b^5$ |
| 1 | 1<u>01</u>1010011 | $(b^5)^2$ |
| 2 | 10<u>11</u>010011 | $((b^5)^2)^2$ |
| 3 | 101<u>10</u>10011 | $((((b^5)^2)^2)^2)*b^5$ |
| 4 | 1011<u>01</u>0011 | $(((((b^5)^2)^2)^2*b^5)^2$ |
| 5 | 10110<u>10</u>011 | $((((((b^5)^2)^2)^2*b^5)^2)^2$ |
| 6 | 101101<u>00</u>11 | $(((((((b^5)^2)^2)^2*b^5)^2)^2)^2$ |
| 7 | 1011010<u>01</u>1 | $(((((((b^5)^2)^2)^2*b^5)^2)^2)^2)^2*b^3$ |

FIG. 9

| MAJOR LOOP ITERATION | MINOR LOOP | COMPONENTS | PARTIAL PRODUCTS |
|---|---|---|---|
| 1 | 1 | $a_1 b_1$<br>$a_1 b_2$<br>$a_1 b_3$<br>$a_1 b_4$ | $c_1 = a_1 b_1 \, mod(2^x)$<br>$c_2 = a_1 b_2 + carry \, mod(2^x)$<br>$c_3 = a_1 b_3 + carry \, mod(2^x)$<br>$c_4 = a_1 b_4 + carry \, mod(2^x)$<br>$c_5 = carry \, mod(2^x)$ |
| | 2 | — | $c_1 = a_1 b_2 + \Sigma \, mod(2^x)$<br>$c_2 = a_1 b_3 + \Sigma \, mod(2^x)$<br>$c_3 = a_1 b_4 + \Sigma \, mod(2^x)$<br>$c_4 = \Sigma \, mod(2^x)$<br>$c_5 = carry \, mod(2^x)$ |
| 2 | 1 | $a_2 b_1$<br>$a_2 b_2$<br>$a_2 b_3$<br>$a_2 b_4$ | $c_1 = a_2 b_1 + a_1 b_2 + \Sigma \, mod(2^x)$<br>$c_2 = a_2 b_2 + a_1 b_3 + \Sigma \, mod(2^x)$<br>$c_3 = a_2 b_3 + a_1 b_4 + \Sigma \, mod(2^x)$<br>$c_4 = a_2 b_4 + \Sigma \, mod(2^x)$<br>$c_5 = carry + \Sigma \, mod(2^x)$ |
| | 2 | — | $c_1 = a_2 b_2 + a_1 b_3 + \Sigma \, mod(2^x)$<br>$c_2 = a_2 b_3 + a_1 b_4 + \Sigma \, mod(2^x)$<br>$c_3 = a_2 b_4 + \Sigma \, mod(2^x)$<br>$c_4 = \Sigma \, mod(2^x)$<br>$c_5 = carry \, mod(2^x)$ |
| 3 | 1 | $a_3 b_1$<br>$a_3 b_2$<br>$a_3 b_3$<br>$a_3 b_4$ | $c_1 = a_3 b_1 + a_2 b_2 + a_1 b_3 + \Sigma \, mod(2^x)$<br>$c_2 = a_3 b_2 + a_2 b_3 + a_1 b_4 + \Sigma \, mod(2^x)$<br>$c_3 = a_3 b_3 + a_2 b_4 + \Sigma \, mod(2^x)$<br>$c_4 = a_3 b_4 + \Sigma \, mod(2^x)$<br>$c_5 = carry \, mod(2^x)$ |
| | 2 | — | $c_1 = a_3 b_2 + a_2 b_3 + a_1 b_4 + \Sigma \, mod(2^x)$<br>$c_2 = a_3 b_3 + a_2 b_4 + \Sigma \, mod(2^x)$<br>$c_3 = a_3 b_4 + \Sigma \, mod(2^x)$<br>$c_4 = \Sigma \, mod(2^x)$<br>$c_5 = carry \, mod(2^x)$ |
| 4 | 1 | $a_4 b_1$<br>$a_4 b_2$<br>$a_4 b_3$<br>$a_4 b_4$ | $c_1 = a_4 b_1 + a_3 b_2 + a_2 b_3 + a_1 b_4 + \Sigma \, mod(2^x)$<br>$c_2 = a_4 b_2 + a_3 b_3 + a_2 b_4 \, \Sigma \, mod(2^x)$<br>$c_3 = a_4 b_3 + a_3 b_4 + \Sigma \, mod(2^x)$<br>$c_4 = a_4 b_4 + \Sigma \, mod(2^x)$<br>$c_5 = carry \, mod(2^x)$ |

COMPUTATIONALLY EFFICIENT MODULAR MULTIPLICATION METHOD AND APPARATUS

This application is a continuation of application Ser. No. 09/050,379, filed Mar. 30, 1998 now abandoned.

CROSS-REFERENCE TO RELATED APPLICATIONS

This application is related to co-pending and commonly assigned application Ser. No. 08/828,368, entitled "High-Speed Modular Exponentiator," by Gregory A. Powell, Mark W. Wilson, Kevin Q. Truong, and Christopher P. Curren, filed Mar. 28, 1997, now U.S. Pat. No. 6,282,290 which application is hereby incorporated by reference herein.

This application is also related to co-pending and commonly assigned application Ser. No. 09/050,573, entitled "High Speed Montgomery Value Calculation," by Matthew S. McGregor, filed Mar. 30, 1998, now U.S. Pat. No. 6,240,436 which application is also hereby incorporated by reference herein.

BACKGROUND OF THE INVENTION

1. Field of the Invention

The present invention relates to cryptographic systems, and more particularly, to a highly efficient multiplier for performing modular reduction operations integral to cryptographic key calculations.

2. Description of Related Art

Cryptographic systems are commonly used to restrict unauthorized access to messages communicated over otherwise insecure channels. In general, cryptographic systems use a unique key, such as a series of numbers, to control an algorithm used to encrypt a message before it is transmitted over an insecure communication channel to a receiver. The receiver must have access to the same key in order to decode the encrypted message. Thus, it is essential that the key be communicated in advance by the sender to the receiver over a secure channel in order to maintain the security of the cryptographic system; however, secure communication of the key is hampered by the unavailability and expense of secure communication channels. Moreover, the spontaneity of most business communications is impeded by the need to communicate the key in advance.

In view of the difficulty and inconvenience of communicating the key over a secure channel, so-called public key cryptographic systems are proposed in which a key may be communicated over an insecure channel without jeopardizing the security of the system. A public key cryptographic system utilizes a pair of keys in which one is publicly communicated, i.e., the public key, and the other is kept secret by the receiver, i.e., the private key. While the private key is mathematically related to the public key, it is practically impossible to derive the private key from the public key alone. In this way, the public key is used to encrypt a message, and the private key is used to decrypt the message.

Such cryptographic systems often require computation of modular exponentiations of the form $y = b^e \mod n$, in which the base b, exponent e and modulus n are extremely large numbers, e.g., having a length of 1,024 binary digits or bits. If, for example, the exponent e were transmitted as a public key, and the base b and modulus n were known to the receiver in advance, a private key y could be derived by computing the modular exponentiation. It would require such a extremely large amount of computing power and time to factor the private key y from the exponent e without knowledge of the base b and modulus n, that unauthorized access to the decrypted message is virtually precluded as a practical matter.

A drawback of such cryptographic systems is that calculation of the modular exponentiation remains a daunting mathematical task even to an authorized receiver using a high speed computer. With the prevalence of public computer networks used to transmit confidential data for personal, business and governmental purposes, it is anticipated that most computer users will want cryptographic systems to control access to their data. Despite the increased security, the difficulty of the modular exponentiation calculation will substantially drain computer resources and degrade data throughput rates, and thus represents a major impediment to the widespread adoption of commercial cryptographic systems.

Accordingly, a critical need exists for a high speed modular exponentiation method and apparatus to provide a sufficient level of communication security while minimizing the impact to computer system performance and data throughput rates.

SUMMARY OF THE INVENTION

In accordance with the teachings of the present invention, a highly efficient method and apparatus is disclosed for performing operations required for modular exponentiation. The apparatus is especially well suited for implementing multiplications using the Montgomery algorithm.

The efficient multiplier architecture uses a preload register, coupled to a multiplier at a second input port via a KN bit bus to load the value of the "a" multiplicand in the multiplier in a single clock pulse. The "b" multiplicand (which is also KN bits long) is supplied to the multiplier N bits at a time from a memory via an N bit bus coupled to a multiplier. The multiplier multiplies the N bits of the "b" multiplicand by the KN bits of the "a" multiplicand and provides that product at a multiplier output N bits at a time, where it can be supplied to the memory.

The efficient multiplication method using the foregoing architecture is also described. The method begins by providing KN bits of the multiplicand "a" from a preload register to a second multiplier input port in a single clock pulse. Then, N bits of the multiplicand "b" are provided to a first multiplier input port, also in a single clock pulse. The KN bits of the number "a" are multiplied by the K bits of the number "b" until all of the KN bits of the "b" multiplicand are provided to the first multiplier input port and multiplied by the KN bits of the "a" multiplicand. When completed, these operations result in an output number, which is then transmitted to the memory, where it can be made available for further processing.

In accordance with the deterministic behavior of the Montgomery algorithm, one embodiment of the present invention loads a predicted (future) value for multiplicand "a" into the preload register while multiplication operations on the current "a" and "b" multiplicands are being performed. This technique further reduces the clock cycles necessary to load and multiply the parameters.

A more complete understanding of the computationally efficient multiplier will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIGS. 5a–i c are block diagrams of an exponent register within various stages of the exponent bit scanning operation of FIG. 4;

FIG. 9 is a chart showing an exemplary multiplication and squaring operation in accordance with the flow charts of FIGS. 6 and 7;

DETAILED DESCRIPTION OF THE PREFERRED EMBODIMENT

The present invention satisfies the need for a high speed modular exponentiation method and apparatus which provides a sufficient level of communication security while minimizing the impact to computer system performance and data throughput rates. In the detailed description that follows, like element numerals are used to describe like elements in one or more of the figures.

Figure 1:
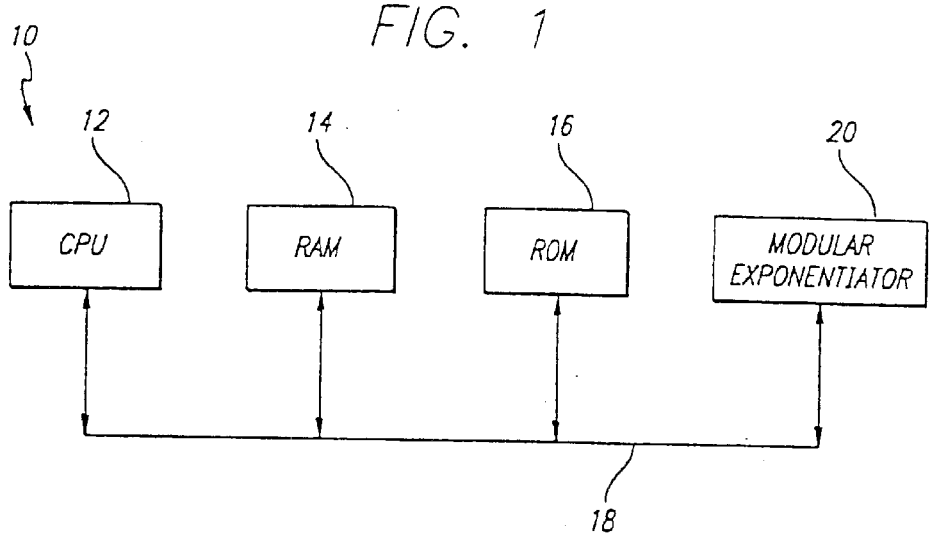
FIG. 1 is a block diagram of an exemplary application of a modular exponentiator within a cryptographic system.

Referring first to FIG. 1, a block diagram of an application of a modular exponentiator 20 within an exemplary cryptographic system 10 is illustrated. The exemplary cryptographic system 10 includes a central processing unit (CPU) 12, a random access memory (RAM) 14, a read only memory (ROM) 16, and modular exponentiator 20. Each of the elements of the cryptographic system 10 are coupled together by a bidirectional data and control bus 18, over which data and control messages are transmitted. The CPU 12 controls the operation of the cryptographic system 10, and may be provided by a conventional microprocessor or digital signal processor circuit. The RAM 14 provides temporary data storage for operation of the CPU 12, and the ROM 16 provides for non-volatile storage of an instruction set, i.e., software, that is executed in a sequential manner by the CPU 12 to control the overall operation of the cryptographic system 10. The modular exponentiator 20 may comprise a special function device, such as an application specific integrated circuit (ASIC) or field programmable gate array (FPGA), that is accessed by the CPU 12 to perform modular exponentiation operations. Alternatively, the elements of the cryptographic system 10 may all be contained within a single ASIC or FPGA in which the modular exponentiator 20 is provided as an embedded core process.

As known in the art, the cryptographic system provides an interface between a non-secure communication channel and a data user. The cryptographic system receives encrypted data from an external source, such as a remote transmitter (not shown) which is communicating with the cryptographic system over the communication channel. The encrypted data is decrypted by the cryptographic system, and the decrypted data is provided to the data user. Conversely, the data user provides decrypted data to the cryptographic system for encryption and subsequent transmission across the communication channel. The cryptographic system also receives and transmits various non-encrypted messages, such as control data and the public key information. It should be apparent that all communications with the cryptographic system occur via the data and control bus 18.

Figure 2:
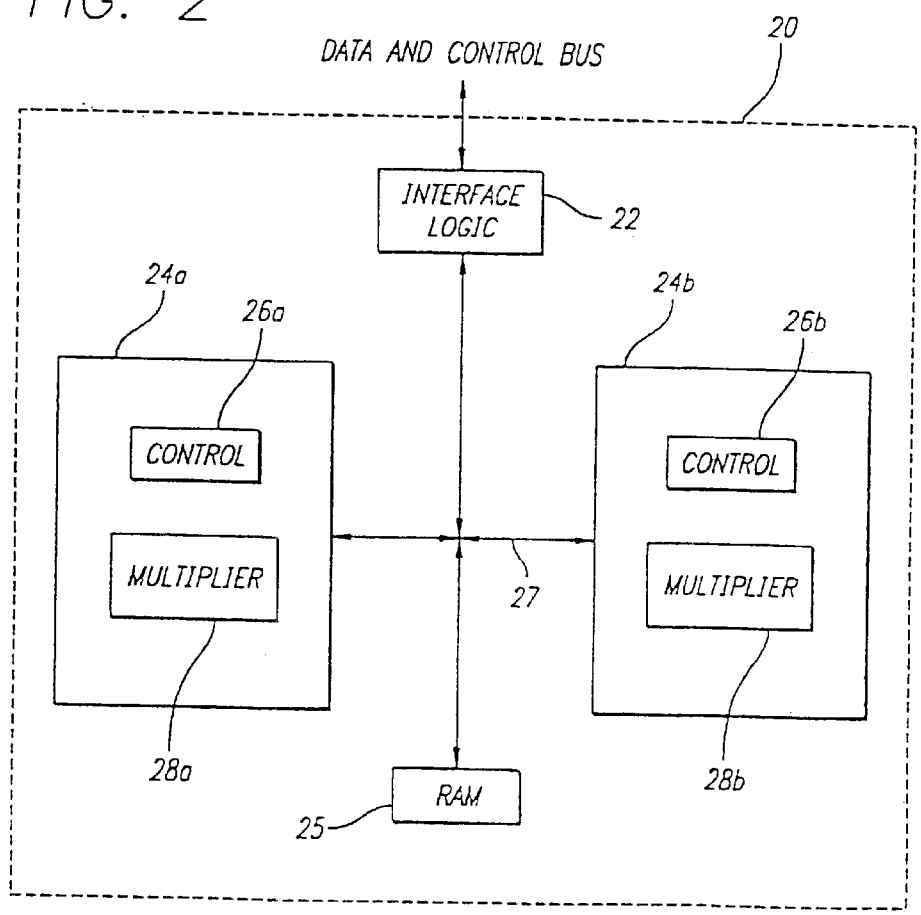
FIG. 2 is a block diagram of the modular exponentiator.

The modular exponentiator 20 is illustrated in greater detail in FIG. 2. The modular exponentiator 20 comprises an interface logic unit 22, a pair of parallel processing units 24a, 24b, and a RAM 25, which all communicate internally over a data and control bus 27. The interface logic unit 22 controls communications between the modular exponentiator 20 and the data and control bus 18 of the cryptographic system 10 described above. The processing units 24a, 24b comprise respective control units 26a, 26b and multiplier units 28a, 28b, which further comprise internal circuit elements that execute a modular exponentiation process, as will be further described below. The RAM 25 provides for temporary storage of data values generated by the control units 26a, 26b and multiplier units 28a, 28b while executing a modular exponentiation operation.

Figure 3:
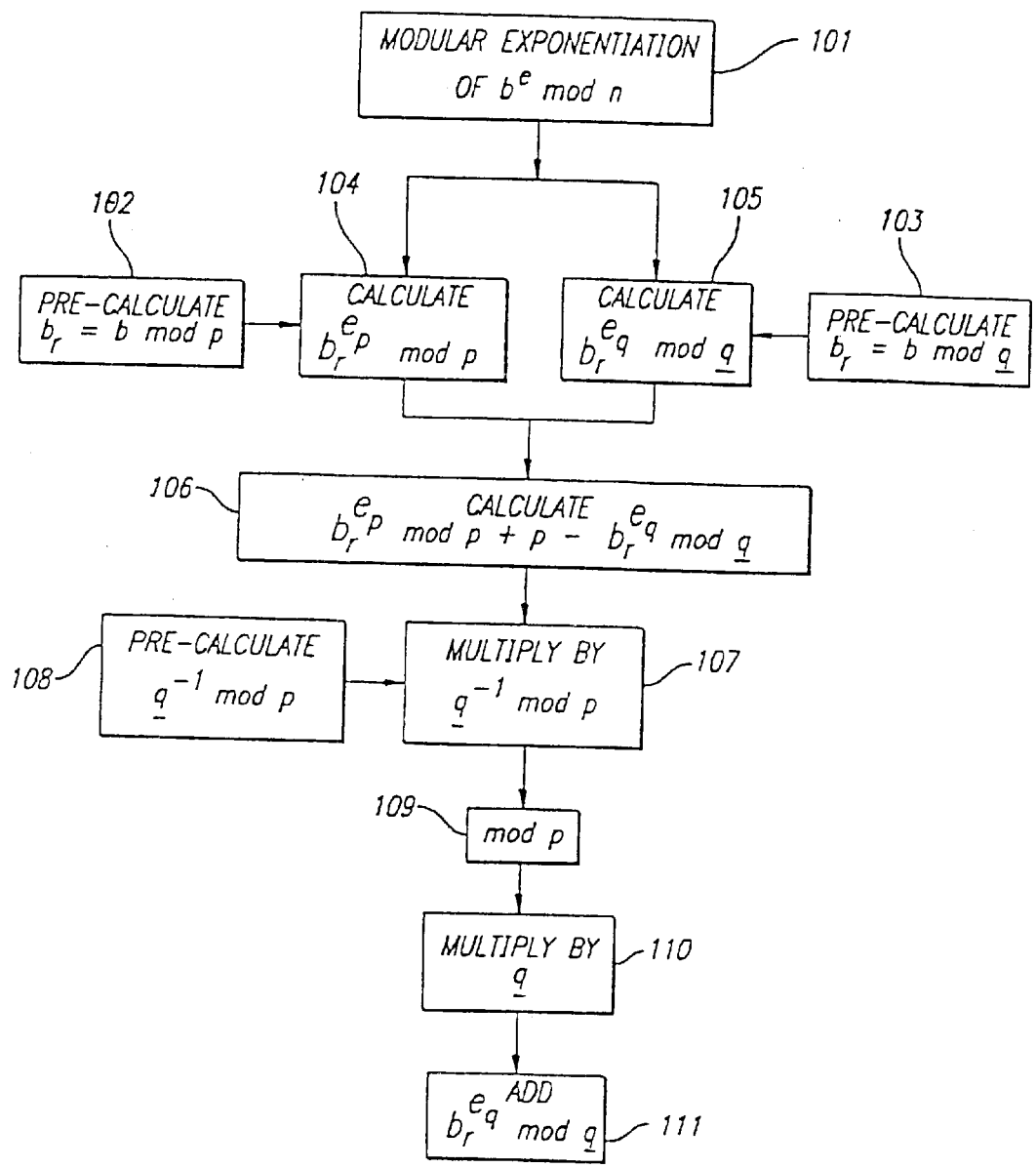
FIG. 3 is a system level flow diagram of the functions performed by the modular exponentiator.

Referring now to FIG. 3 in conjunction with FIG. 2 described above, a system level flow diagram of the functions performed by the modular exponentiator 20 is illustrated. As shown at step 101, the modular exponentiator 20 will compute a modular exponentiation of the form $y=b^e$ mod n, in which the modulus n, base b and exponent e are each k bits long. In a preferred embodiment of the present invention, k is 1,024 bits. Using conventional methods, solving such a modular exponentiation would require a tremendous amount of computing power due to the large number and size of the multiplications and modular reductions that must be performed. In the present invention, the modular exponentiation is solved in a highly efficient manner by reducing the size of the problem and by reducing the number of multiplications that are performed.

As a first step in solving the modular exponentiation, the original exponentiation is split into components, as follows:

$$b^e \bmod n = (((q^{-1} \bmod p * (b_r^{e_q} \bmod p + p - b_r^{e_q} \bmod q)) \bmod p) * q) + b_r^{e_q} \bmod q$$

in which p and q are large prime numbers whereby $n=p*q$. For maximum security, p and q should be roughly the same size. The term $q^{-1}$ mod p is a special value called an inverse which is derived from the Chinese remainder theorem, as known in the art. In particular, $q^{-1}$ mod p is the inverse of q mod p. Since the inverse represents a modular exponentiation of the same order as $b^{e_p}$ mod p, the inverse may be pre-calculated in advance, and stored in the RAM 25 at step 108. The values $e_p$ and $e_q$ are k/2 bit values equal to e mod (p−1) and e mod (q−1), respectively. A reduced base term $b_r$ for each of $b_r^{e_p}$ mod p and $b_r^{e_q}$ mod q is provided by taking a modular reduction of b with respect to p and q, respectively. The reduced base terms $b_r$ thus have a k/2 bit length as well.

Splitting the modular exponentiation permits its solution in two parallel paths, as illustrated in FIG. 3, which are processed separately by the respective processing units 24a, 24b of FIG. 2. At steps 104, 105, the modular exponentiations $b_r^{e_p}$ mod p and $b_r^{e_q}$ mod q are calculated separately using techniques that will be further described below. The $b_r$ terms of each of the two modular exponentiations may be pre-calculated in advance, and stored in the RAM 25 at steps 102, 103.

Since p and q are each respectively k/2 bits in length, the magnitude of the respective problems is thus reduced substantially from its original form. Moreover, the parallel calculation of two reduced-size modular exponentiations requires substantially less computer processing time than a corresponding calculation of the original modular exponentiation within a single processing unit. The reduction in processing time results from the fact that the number of multiplies needed to perform an exponentiation with an efficient algorithm (such as described below) is proportional to $2s^2+s$, where s is equal to k divided by the multiplication operand size in bits. If an s word problem was treated as two separate s/2 word problems, the number of multiply operations per exponentiation is reduced to a value proportional to $$\frac{s^2}{2} + \frac{s}{2}.$$

For example, if k were 1,024 bits and the multiplication operand were 128 bits, s would be equal to 8. Accordingly, an s word problem would require a number of multiply operations proportional to 136, while the two separate s/2 word problems would respectively require a number of multiply operations proportional to 36. Thus, the number of multiply operations is reduced by 3.778 times.

Following the calculations of steps 104, 105, the $b_r^{e_p}$ mod q term is subtracted from $b_r^{e_p}$ mod p and the result is added to p at step 106. At step 107, the resulting sum is multiplied by the inverse $q^{-1}$ modp which was pre-calculated at step 108. This step may be performed by one of the multipliers 28a, 28b, which are optimized for modular operations as will be further described below. The resulting product is modularly reduced with respect to p at step 109, and further multiplied by q at step 110 to produce a k-bit value. Lastly, the product of that final multiplication is added to $b_r^{e_q}$ mod q at step 111, which was previously calculated at step 105. It should be appreciated that the modular reduction that occurs at step 109 is much easier than the original modular exponentiation in view of the substantial reduction in size of the original $b^e$ term. This final solution to the modular exponentiation is provided to the data and control bus 18 for further use by the CPU 12.

Figure 4:
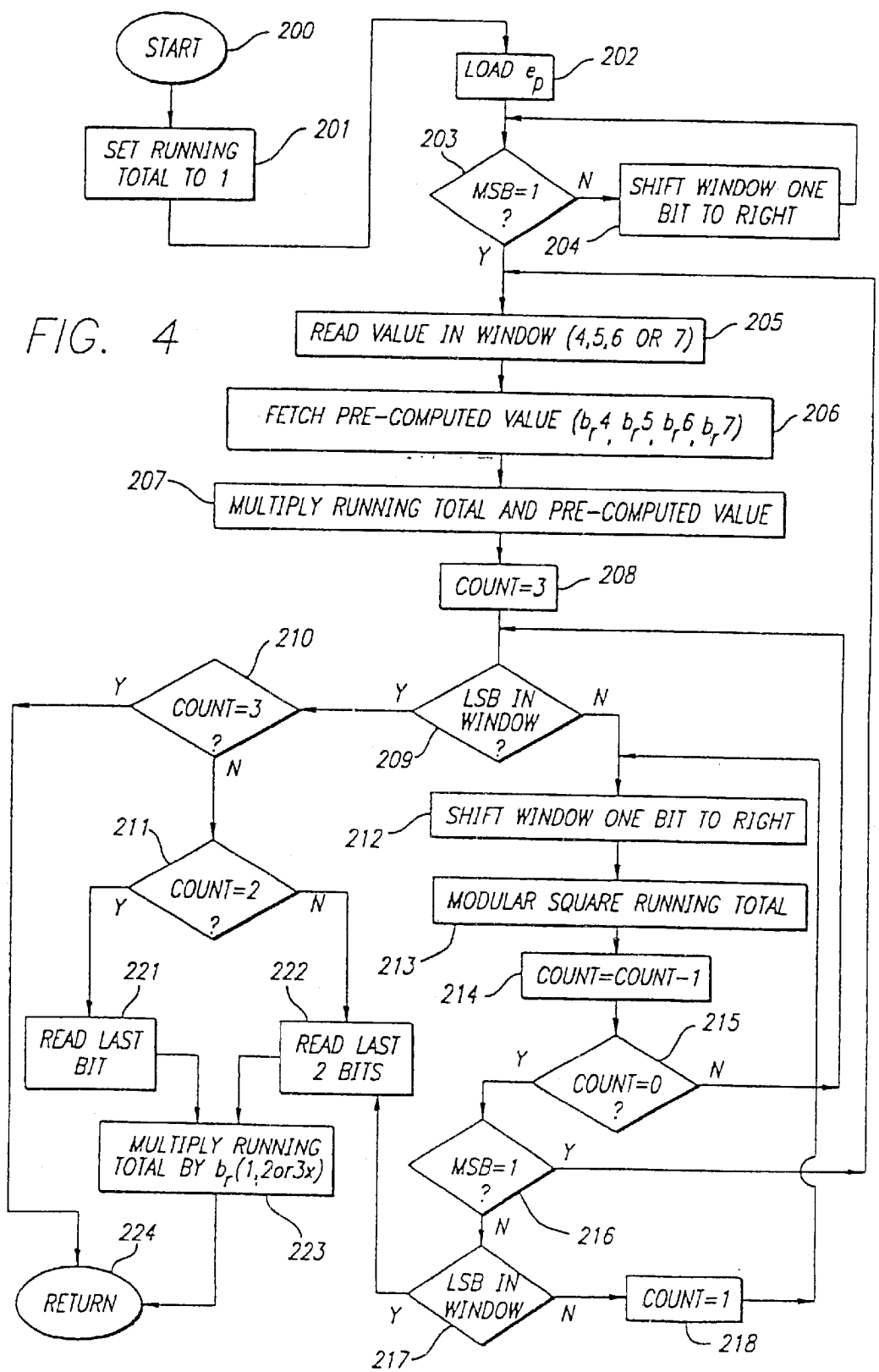
FIG. 4 is a flow chart showing an exponent bit scanning operation performed by the modular exponentiator.

Referring now to FIGS. 4 and 5a–i c, the modular exponentiations of $b_r^{e_p}$ mod p and $b_r^{e_q}$ mod q from steps 104, 105 of FIG. 3 are shown in greater detail. Specifically, FIG. 4 illustrates a flow chart describing a routine referred to herein as exponent bit-scanning, which is used to reduce the number of multiplications necessary to perform an exponentiation. In general, the exponent bit-scanning routine factors the exponentials $b_r^{e_p}$ and $b_r^{e_q}$ into a product of precomputed powers of the reduced base $b_r$ modularly reduced with respect to p or q. The routine may be coded in firmware and executed sequentially by the respective processing units 24a, 24b described above in the form of a software program. Alternatively, the routine may be hard-wired as discrete logic circuits that are optimized to perform the various functions of the exponent bit-scanning routine. For convenience, the description that follows will refer only to the operation of the exponent bit scanning routine with respect to the exponential $b_r^{e_p}$, but it should be appreciated that a similar operation must be performed with respect to the exponential $b_r^{e_q}$.

Figure 5A:
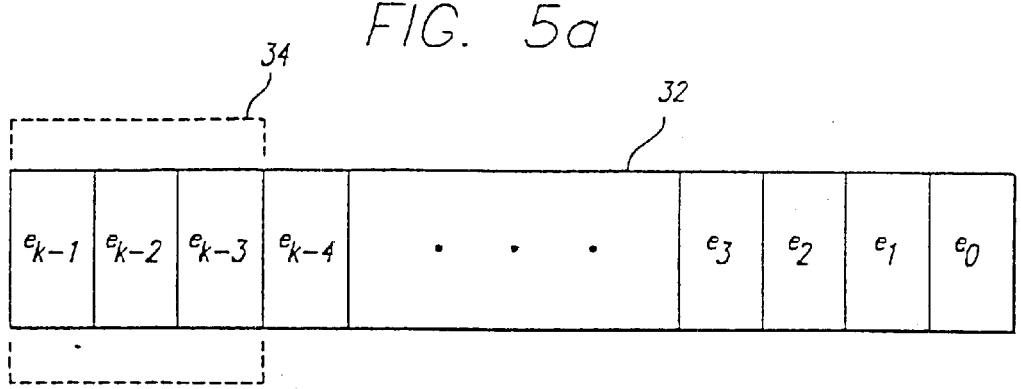
Figure 5B:
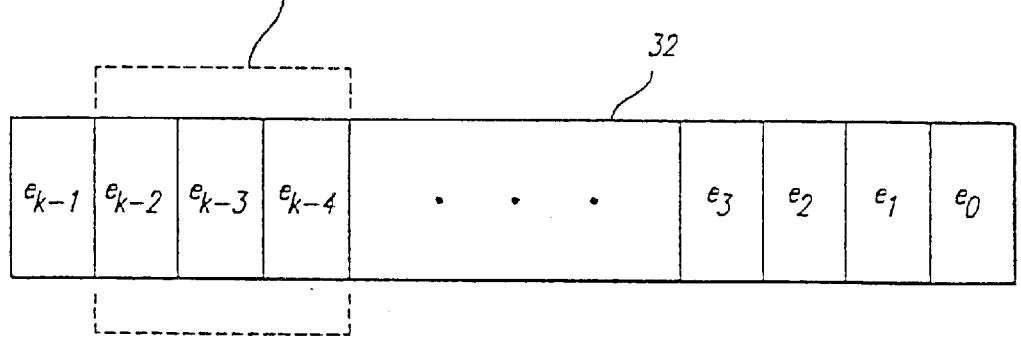
Figure 5C:
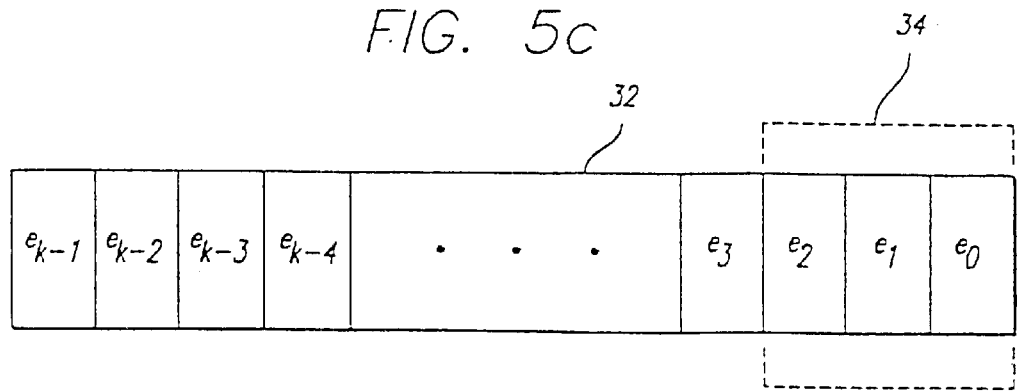

The exponent bit-scanning routine is called at step 200, and a running total is initialized to one at step 201. An exponent $e_p$ to be bit-scanned is loaded into a register at step 202. FIGS. 5a–i c illustrate a k-bit exponent e (i.e., $e_{k-1}$-$e_0$) loaded into a register 32. The register 32 may comprise a predefined memory space within the RAM 25. First, a window 34 is defined through which a limited number of bits of the exponent e are accessed. A window size of three bits is used in an exemplary embodiment of the present invention, though it should be appreciated that a different number could also be advantageously utilized. The window 34 is shifted from the left of the register 32 until a one appears in the most significant bit (MSB) of the 3-bit window, as shown by a loop defined at steps 203 and 204. In step 203, the MSB is checked for presence of a one, and if a one is not detected, the window 34 is shifted by one bit to the right at step 204. FIG. 5b illustrates the window 34 shifted one bit to the right. It should be apparent that steps 203 and 204 will be repeated until a one is detected.

At step 205, a one has been detected a the MSB, and the value of the three-bit binary number in the window 34 is a read. The number is necessarily a 4, 5, 6 or 7 (i.e., binary 100, 101, 110 or 111, respectively) since the MSB is one. At step 206, a pre-computed value for the reduced base $b_r$ raised to the number read from the window 34 (i.e., $b_r^4$, $b_r^5$, $b_r^6$ or $b_r^7$, respectively) is fetched from memory. This pre-computed value is multiplied by a running total of the exponentiation at step 207. It should be appreciated that in the first pass through the routine the running total is set to one as a default.

Thereafter, a loop begins at step 209 in which the register 32 is checked to see if the least significant bit (LSB) of the exponent $e_p$ has entered the window 34. Significantly, step 209 checks for the LSB of the entire exponent $e_p$, in contrast with step 203 which reads the MSB of the window 34. If the LSB has not yet entered the window 34, the loop continues to step 212 at which the window 34 is successively shifted to the right, and step 213 in which the running total is modular squared with each such shift. The loop is repeated three times until the previous three bits are no longer in the window 34, i.e., three shifts of the window. Once three shifts have occurred, the routing determines at step 216 whether the MSB is one. If so, the routine returns to step 205, and the value in the window 34 is read once again. Alternatively, if the MSB is zero, then the register 32 is again checked at step 217 to see if the LSB of the exponent $e_p$ has entered the window 34. If the LSB is not in the window 34, the loop including steps 212 and 213 is again repeated with the window again shifted one bit to the right and the running total modular squared with the shift.

If, at step 217, the LSB has entered the window 34, this indicates that the end of the exponent $e_p$ has been reached and the exponent bit-scanning routine is almost completed. At step 222, the last two bits in the window 34 are read, and at step 223 the running total is multiplied by the reduced base $b_r$, the number of times the value read in the window. For example, if the value of the lower tow bits is a one, two, or three (i.e., binary 01, 10 or 11, respectively), then the previous running total is multiplied by the reduced base $b_r$ one, two or three times, respectively. If the value of the lower two bits is a 0, then the running total is not changed (i.e., multiplied by one). Then, the exponent bit-scanning routine ends at step 224.

Returning to step 209 discussed above, before the loop begins, the register 32 is checked to see if the LSB of the exponent $e_p$ has entered the window 34. If the LSB has entered the window 34, a series of step are performed in which the count value is checked. The count value keeps track of the number of passes through the above-described loop that have taken place. If the count value is three, indicating that all of the bits in the window 34 have been previously scanned, then the exponent bit-scanning routine ends at step 224. If the count value is two, then all but the last bit in the window 34 has been previously scanned, and at step 221, the value of the last bit is read. If the count value is one, then only the first bit in the window 34 has been previously scanned, and at step 222, the value of the last two bits is read (as already described above). Once again, at step 223 the running total is multiplied by the reduced base $b_r$ the number of times the value read in the window. Then, the exponent bit-scanning routine ends at step 224.

Figures 7, 8:
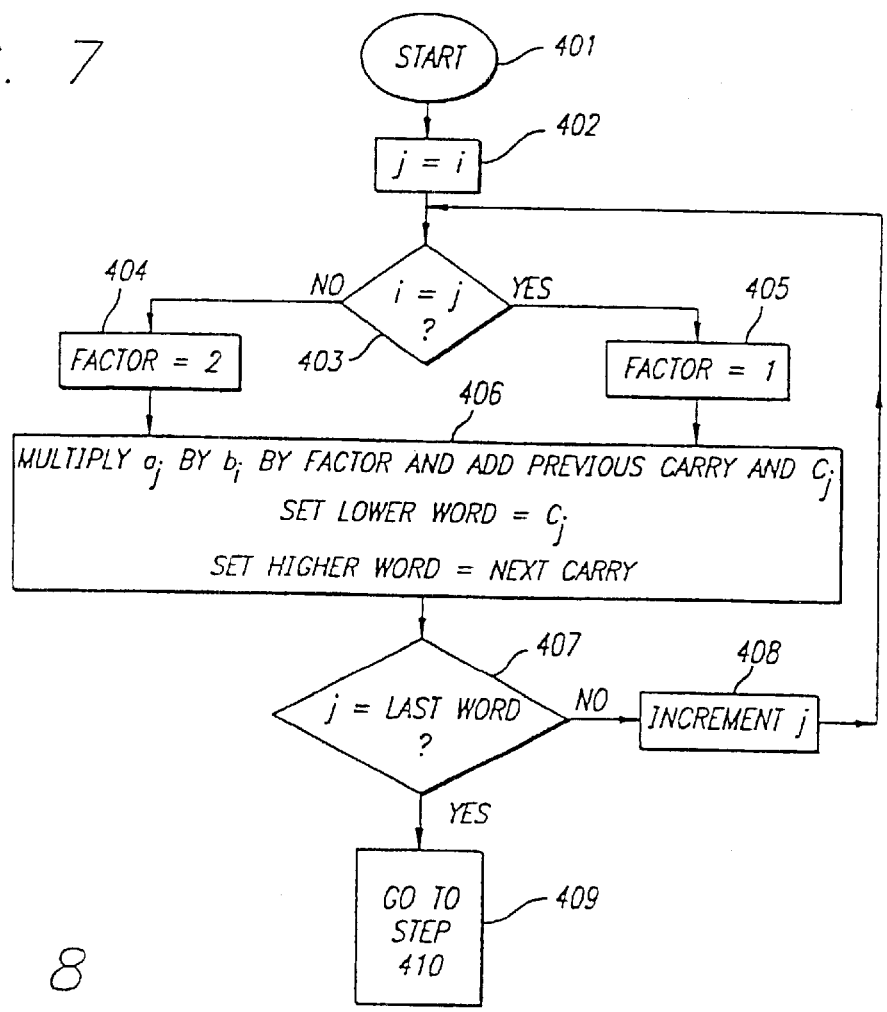
FIG. 7 is a flow chart showing a squaring operation performed in conjunction with the multiplication operation of FIG. 6.
FIG. 8 is a chart showing an exemplary exponent bit scanning operation in accordance with the flow chart of FIG. 4.

An example of the exponent bit-scanning technique is illustrated in FIG. 8 with respect to a modular exponentiation of a base b raised to a ten-bit exponent e, in which e=1011010011. The successive shifts reduce the exemplary term $b^{1011010011}$ to $((((((b^5)^2)^2)^2)*b^5)^2)^2)^2*b^3$. Since the term $b^5$ was precalculated and fetched from memory, processing time is saved by not having to calculate that term. In addition, there are additional processing time savings that are achieved in performing a modular reduction of the exemplary term with respect to n due to the distributive nature of modular reduction. Rather than a huge number of multiplications followed by an equally huge modular reduction, only nine multiplications and modular reductions are required, and the modular reductions are smaller in magnitude since the intermediate values are smaller.

It should be appreciated that the modular squaring step that occurs with each shift is necessary since the exponent bit-scanning begins at the MSB of the exponent $e_p$ where the window value is not really 4, 5, 6 or 7, but is actually 4, 5, 6 or 7 times $2^k$ where k is the exponent bit position for the window's LSB bit. Since the value of the exponent $e_p$ is interpreted as a power of the base $b_r$, a factor of $2^k$ implies squaring k times. Multiplying by a precalculated value when the window MSB is one is used to insure that all ones in the exponent $e_p$ are taken into account and to reduce the total number of pre-calculated values that are needed.

Even though the exponent bit-scanning routine has reduced the number of multiplications that have to be performed in the respective calculations of $b_r^{e_p}$ mod p and $b_r^{e_q}$ mod q, there still are a number of multiplications that need to be performed. The modular exponentiator 20 utilizes an efficient multiplication algorithm for modular terms, referred to in the art as Montgomery multiplication. The Montgomery algorithm provides that:

$$Mont(a, b) = \frac{(a*b)}{2^k} \mod n$$

where k is the number of bits in the modulus n, n is relatively prime to $2^k$, and n>a, n>b. In order to use the algorithm for repeated multiplies, the values of a and b must be put into Montgomery form prior to performing the Montgomery multiply, where:

$$x*2^k \mod n = x_{Mont}$$

If the two values to the Montgomery multiplied are in Montgomery form, then the result will also be in Montgomery form.

Figure 6:
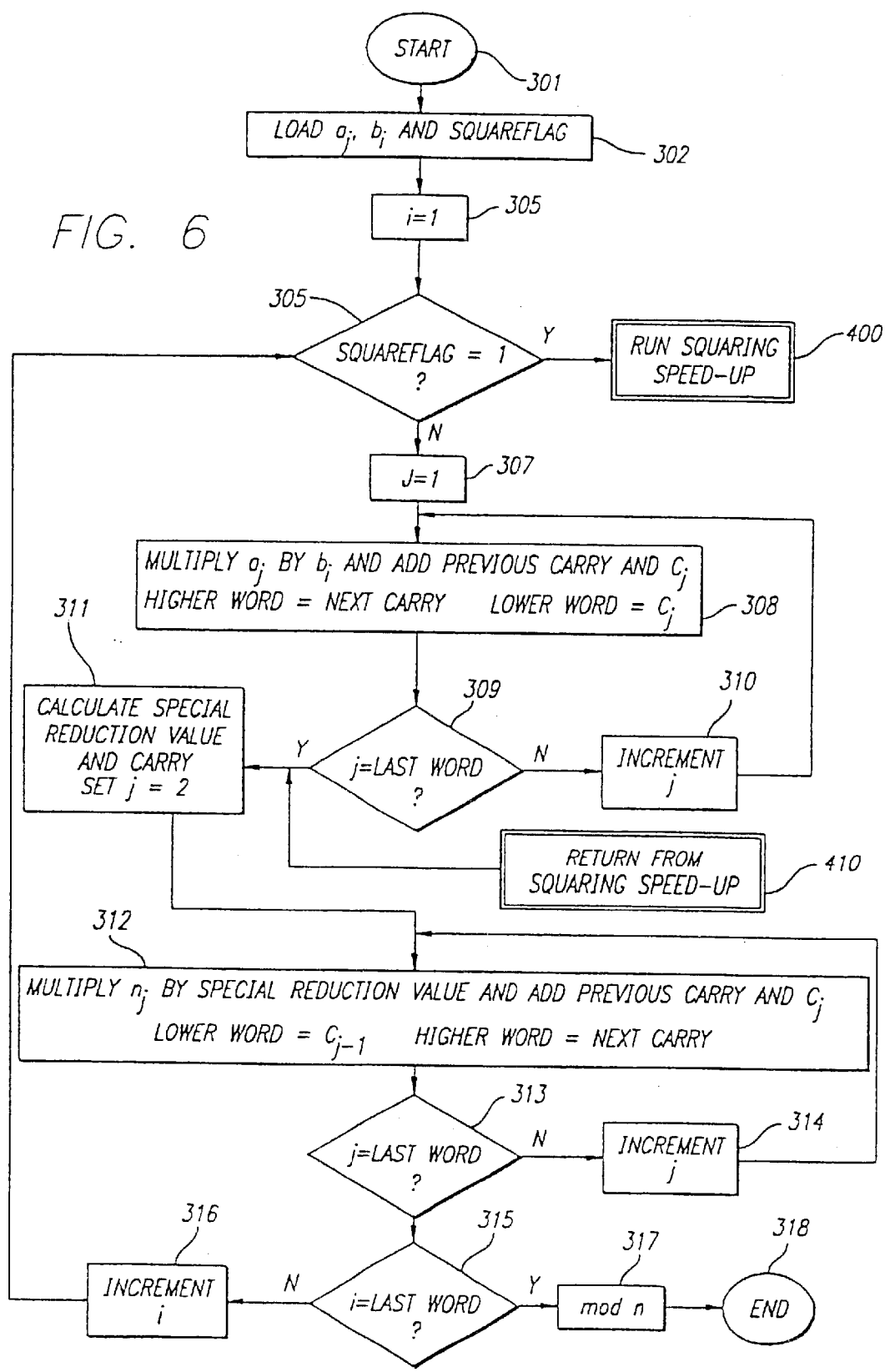
FIG. 6 is a flow chart showing a multiplication operation performed by the modular exponentiator.

FIG. 6 illustrates a flow chart describing a Montgomery multiplication operation executed by the modular exponentiator 20. As with the exponent bit-scanning routine described above with respect to FIG. 4, the Montgomery multiplication operation may be coded in firmware and executed sequentially within the respective processing units 24a, 24b by the control units 26a, 26b which access the multipliers 28a, 28b for particular aspects of the operation, as will be further described below. Alternatively, the Montgomery multiplication routine may be hardwired as discrete logic circuits that are optimized to perform the various functions of the routine.

As illustrated in FIG. 6, the Montgomery multiplication routine includes a major loop and two minor loops. In each major loop, a distinct word of a multiplicand $b_i$ is multiplied by each of the words of a multiplicand $a_j$, where j is the number of words in multiplicand $a_j$ and i is the number of words in multiplicand $b_i$. The Montgomery multiplication routine is called at step 301. The two multiplicands $a_j$ and $b_i$ are loaded into respective registers at step 302, along with a square flag. If the two multiplicands $a_j$ and $b_i$ are equal, the square flag is set to one so that a squaring speed-up subroutine may be called at step 400. The squaring speed-up subroutine will be described in greater detail below. If the two multiplicands $a_j$ and $b_i$ are not equal, then the square flag is set to zero.

Before initiating the first major loop, i is set to be equal to one at step 305 so that the first word of multiplicand $b_1$ is accessed. The square flag is checked at step 306 to determine whether the squaring speed-up subroutine should be called, and if not, j is set equal to one at step 307. The two words $a_j$ and $b_i$ are multiplied together within the first minor loop at step 308, and the product added to the previous carry and previous $c_j$. It should be appreciated that in the first pass through the routine, the carry and $c_j$ values are zero. The lower word of the result is stored as $c_j$ and the higher word of the result is used as the next carry. The first minor loop is repeated by incrementing j at step 310 until the last word of a is detected at step 309, which ends the first minor loop. Before starting the second minor loop, a special reduction value is calculated that produces all "0"s for the lowest word of $c_j$ when multiplied with $c_j$, and j is set to two at step 311. Thereafter, at step 312, the special reduction value is multiplied by the modulus $n_j$, added to the previous carry and $c_j$. The lower word of the result is stored as $c_{j-1}$ and the higher word of the result is used as the next carry. The second minor loop is repeated by incrementing j at step 314 until the last word of $c_j$ is detected at step 313, which ends the second minor loop. Once the second minor loop ends, i is incremented at step 316 and the major loop is repeated until the last word of $b_i$ has passed through the major loop. Then, the modular reduction of the final result of $c_j$ with respect to n is obtained at step 317, and the Montgomery multiplication routine ends at step 318. An example of a Montgomery multiplication of $a_j$ with $b_i$ in which both multiplicands are four words long is provided at FIG. 9. In the example, the symbol Σ is used to denote the combination of all previous values.

The Montgomery multiplication routine of FIG. 6 can be speeded up when used to square a number by recognizing that some of the partial products of the multiplication are equal. In particular, when multiplicand $a_j$ is equal to multiplicand $b_i$, i.e., a squaring operation, then the partial products of various components of the multiplication would ordinarily be repeated, e.g., the partial product of $a_2$ with $b_3$ is equal to the partial product of $a_3$ with $b_2$. As illustrated in FIG. 9, both of these partial products occur during the third major loop iteration. Thus, the first time the partial product is encountered it can be multiplied by two to account for the second occurrence, and a full multiplication of the second partial product can be skipped. Multiplication by two constitutes a single left shift for a binary number, and is significantly faster than a full multiplication operation. It should be appreciated that a great number of squaring operations are performed by the modular exponentiator 20 due to the operation of the exponent bit-scanning routing described above, and an increase in speed of the squaring operations would have a significant effect on the overall processing time for a particular modular exponentiation.

FIG. 7 illustrates a flow chart describing the squaring speed-up subroutine, which is called at step 401. Initially, j is set to be equal to i at step 402, which, in the first iteration of the major loop of FIG. 6, will be equal to one. In subsequent iterations of the major loop, however, it should be apparent that j will begin with the latest value of i and will thus skip formation of partial products that have already been encountered. At step 403, i is compared to j. If i is equal to j, then at step 405 a factor is set to one, and if i and j are not equal, then at step 404 the factor is set to two. Thereafter, in step 406, $a_j$ and $b_i$ and the factor are multiplied together the product added to the previous carry and $c_j$. As in step 308 of FIG. 6, the lower word of the result is stored as $c_j$ and the higher word of the result is used as the next carry. After completing the multiplication step 406, j is incremented at step 408 and the loop is repeated until the last word of $b_j$ has passed through the loop, at which time the squaring speed-up subroutine ends at step 409. At step 410 of FIG. 6, the Montgomery multiplication routine resumes just after the first minor loop. It should be appreciated that the squaring speed-up subroutine will operate in place of the first minor loop for every iteration of the major loop of the Montgomery multiplication routine when the squaring flag is set.

In order to perform the Montgomery multiplication routine more efficiently, the multipliers 28a, 28b are tailored to perform specific operations. In particular, the multipliers 28a, 28b include specific functions for multiplying by two (used by the squaring speed-up routine), executing an a*b+c function, and performing the mod $2^n$ function on a 2n-bit result while leaving the higher n bits in a carry register.

Figure 10:
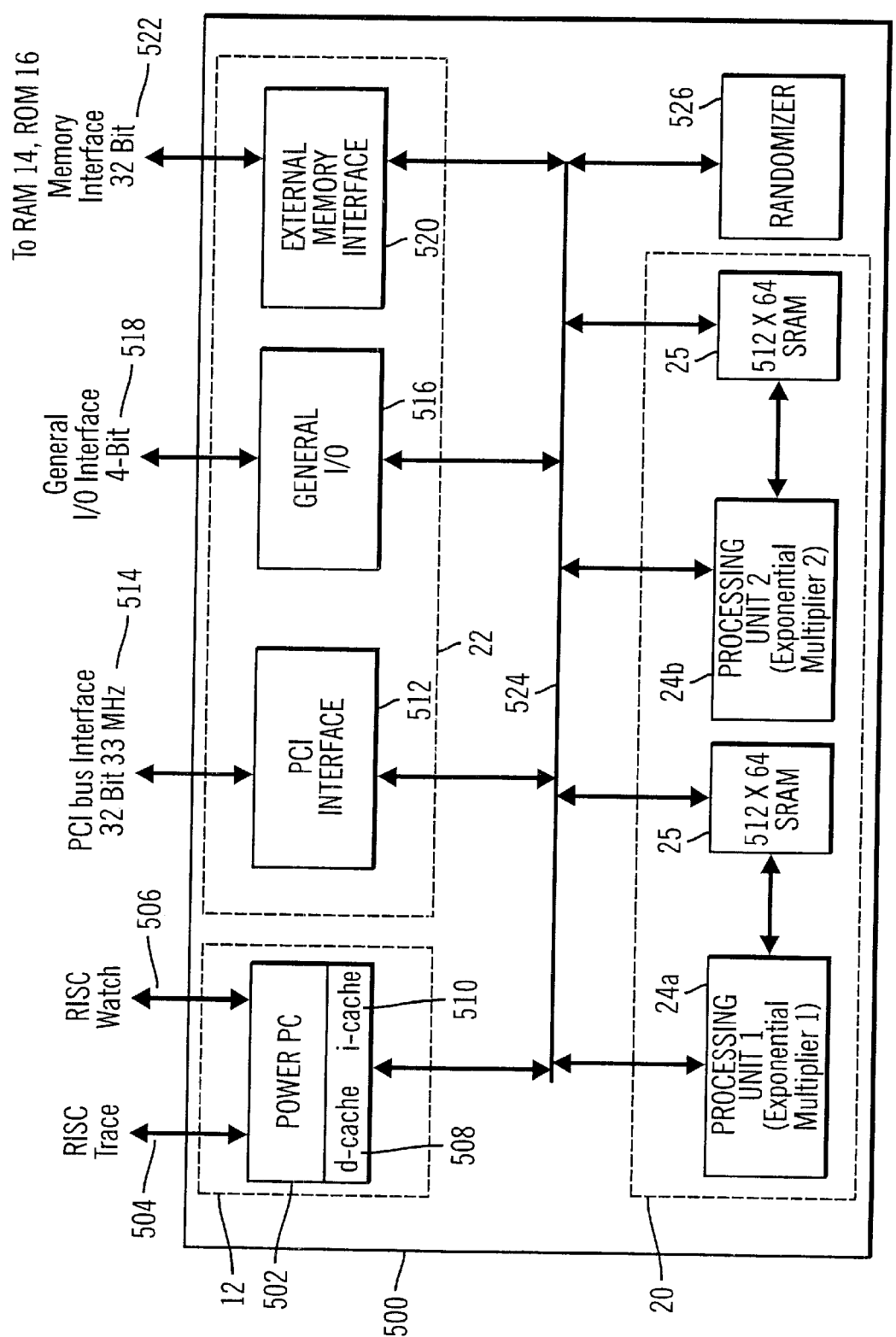
FIG. 10 is a block diagram showing a system architecture which can be employed to practice the present invention.

FIG. 10 is a chart showing a block diagram of a system architecture which can be employed to practice the present invention. In this embodiment, the architecture is implemented on an ASIC 500. ASIC 500 comprises a CPU 12 with a processor 502, which performs operations required to implement the present invention. In one embodiment, processor 502 comprises a reduced instruction set (RISC) POWERPC™ 401 core processor available from the IBM™ Corporation. Processor 502 provides a trace interface 504 and a watch interface 506, and obtains instructions via an external FLASH/SRAM memory interface module 520 and a 32 bit external memory interface 522. The trace interface 504 and the watch interface 506 provide for error detection and debugging. To enhance performance, processor 502 interfaces with the ASIC module bus 524 via a selectable data cache 508 and an instruction cache 510. The ASIC 500 interface logic 22 comprises a general I/O module 516 with a 4 bit external interface 518, an external memory interface module 520 and associated interface 522, and a PCI interface module 512 and associated PCI interface 514. The PCI interface 514 provides a 32 bit data channel nominally operating at 33 MHz. The PCI interface module 512 provides the operations necessary for compliance with the PCI interface I/O and command protocol, including built-in input and output first input first output (FIFO) buffers for efficient data transfer. Data transfer among other modules in the ASIC 500 is provided by the ASIC module bus 524. The ASIC 500 also optionally comprises a high speed dedicated random number generator 526, for key generation and padding. In accordance with the principles described herein, the ASIC 500 also comprises a modular exponentiator 20, which includes pair of parallel processing units 24a 24b, each associated with a RAM 25.

Figure 11:
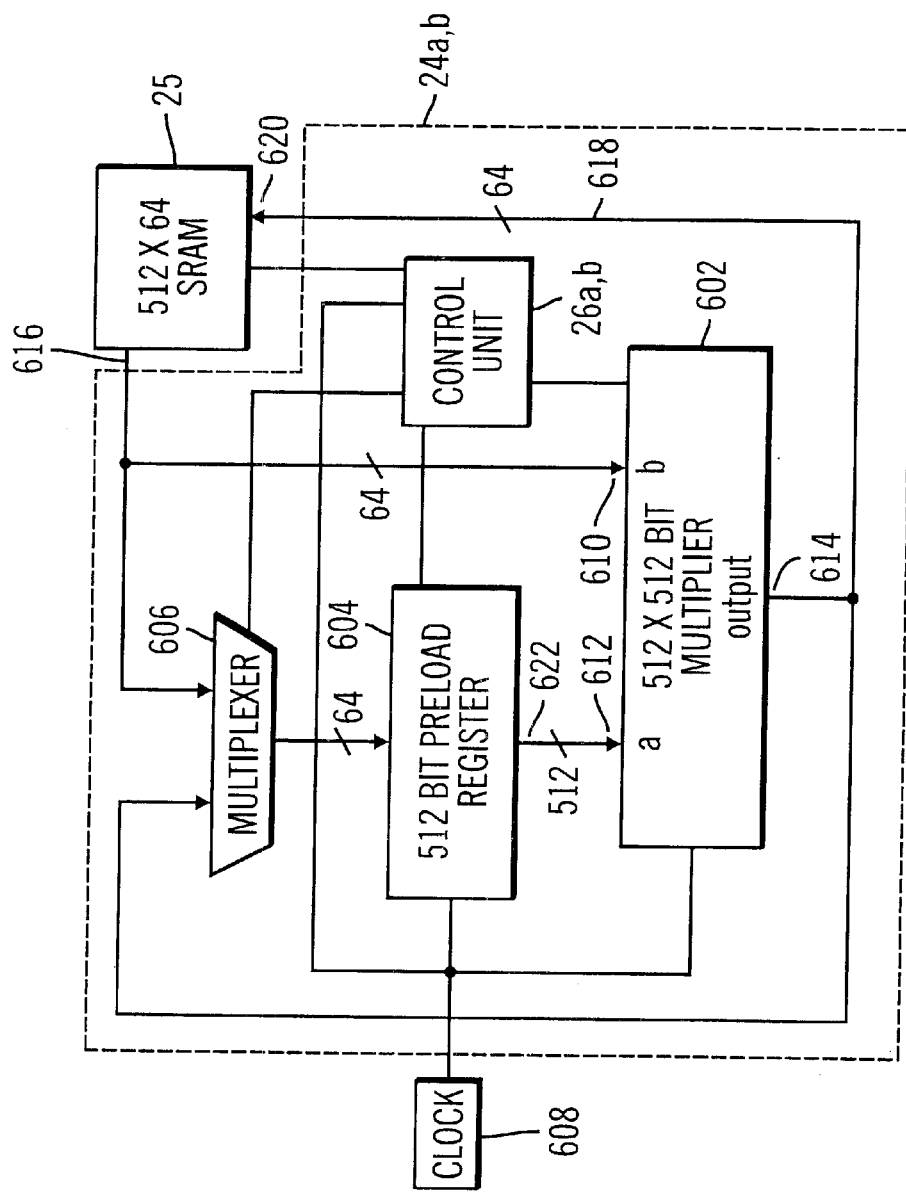
FIG. 11 is a block diagram showing one embodiment of the multiplier and associated modules.

FIG. 11 presents a more detailed view of the processing units 24a,b, the associated RAM 25, and control units 26a, b. The processing unit 24a, b comprises a multiplier 602, a preload register 604, a memory 25, and a multiplexer 606. A control unit 26a, b, operatively coupled to the multiplier 602, preload register 604, memory 25 and multiplexer 606 controls the operation of these respective devices, in accordance with a clock signal provided by clock 608.

It is desirable to perform 1024 bit RSA calculations such as modular exponentiations as quickly as possible, preferably in less than 5 ms at a 33 MHz clock speed. Although the 1024 bit RSA calculations can be reduced to 512 bit calculations using the above teaching, this still leaves the problem of performing two 512 bit calculations within the 5 ms interval.

Ordinarily, multiplier 602 would comprise a 64 bit bus for each input number to be multiplied. However, with such a design, the number of clock pulses necessary to input both values from a 64 bit bus would be too large to support a 5 ms calculation speed with a 33 MHz clock. The present invention provides this high speed capability with a unique architecture that includes a 512 bit multiplier input port coupled to a preload register, and a control unit that enforces an efficient computation protocol to efficiently perform 512 by 512 bit multiplications. Further, because of the predictable nature of the computations required in performing Montgomery multiplications, the control unit 26a, b enforces a computation protocol that minimizes the clock cycles to input a new number into the preload register.

In accordance with the foregoing, the multiplier comprises a first input port 610 with N bit capacity, where N is an integer greater than one, and a second input port 612 with a K*N (hereinafter KN) bit capacity, where K is an integer greater than one. The illustrated embodiment depicts a system wherein N=64, and K=8, representing the situation where the first input port is a 64 bit parallel input port, and the second input port is a 512 bit parallel port. Selecting the capacity of the multiplier first input port 610 to be less than that of the multiplier second port 612 minimizes system resource requirements without substantially impacting the throughput of the multiplier 602. That is because the multiplier 602 only operates on 64 bits of the number at the first input port 610 (the "b" multiplicand) every four clocks as the multiplication is taking place.

To control the value of multiplicand "a" at port 612 in each successive multiplication, inputs to the preload register 604 (representing the multiplicand "a") can be provided by the multiplier 602 (from a multiplier output port 614) or the memory 25 (from a memory output port 616) under selectable control of the multiplexer 606 and the control unit 26a, b. For example, the Montgomery algorithm dictates that the desired value for "a" in the next calculation is often the same as the value for "a" in the preceding multiplication (see for example, FIG. 9). In such cases, the preload register 604 does not require a new value for "a", and the control unit 26a,b will retain the previous value for "a" in the preload register, and provide it to the multiplier 602 when necessary. A data path is also provided from the multiplier output port 614 to the preload register 604 to allow immediately needed results to bypass the memory 25, thereby reducing memory bus traffic.

Presuming that there is a first number ("b") stored in the memory 25, and a second number ("a") loaded into the preload register 604, the multiplication of a*b takes place as follows. In the first clock cycle, the full 512 bit value for the second number ("a") is input from the preload register 604 to the multiplier 602. Next, the first 64 bits of the first number ("b") is loaded into the multiplier 602. Then, over the next 3 clock cycles, the 64 bit first number ("b") is multiplied by the 512 bit second number ("a"). The next 64 bits of the first number ("b") are then loaded into the multiplier 602, and that portion of "b" is multiplied by the 512 bit second number ("a"). This process is repeated until all bits of the "b" multiplicand are multiplied by all bits of the "a" multiplicand. Loading and multiplying all of the bits of "b" by those of "a" takes 8*4=32 clock cycles. After 4 clock cycles of multiplier 602 internal processing, the output, representing the least significant 512 bits of the product of the first number ("b") and the second number ("a"), is outputted over the next 8 clock cycles. The most significant 512 bits of the product remain in the multiplier 602, and are used for further carry operations. Accordingly, 45 clock cycles are required to determine the product of "a" and "b."

Although the data channel 622 from the preload register 604 to the multiplier 602 is 512 bits, the bus capacity to all other input and output ports, including the memory 25 is only 64 bits. Therefore, in cases where a preload value is required (a new "a" value), an additional 8 clock cycles would ordinarily be required to load the value from the memory 25 to the preload register 604 from the 64 bit data channel. This would mean that for any multiplication requiring a new "a" value, the number of required clock cycles to complete the operation would be 45+8=53. To avoid this problem the control unit 26a, b of the present invention invokes a different command protocol when a new "a" value is expected. This protocol makes use of the 64 bit input bus during the three clocks after each 64 bit "b" value is supplied to the multiplier 602. In particular, the predicted, future value needed for the next multiplication is fetched from the memory 25 and directed to the preload register 604 during the clock period following the input of the "b" value to the multiplier 602. The predicted future value for "a" is ascertainable due to the deterministic nature of the Montgomery multiplication routine, which frequently uses the same "a" value while varying only the "b" value.

Figure 12:
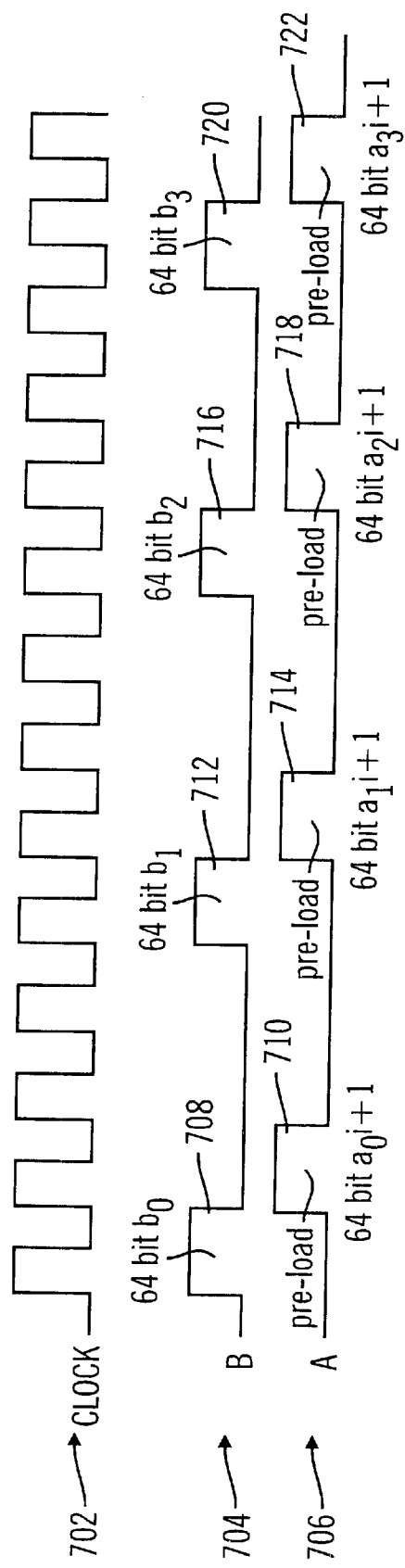
FIG. 12 is a timing diagram showing the pre-loading of predictive multiplicands.

FIG. 12 is a timing diagram illustrating the foregoing logic. Trace 702 represents the signal from the clock 608. Trace 704 indicates the clock cycles where values for "b" are supplied to the multiplier 602 from the memory 25. Since the bus connecting the memory 25 output port 616 and the multiplier first input port 610 is a 64 bit bus, values for the 512 bit number "b" are supplied to the multiplier 602 in 64 bit increments. Accordingly, location 708 on trace 704 indicates where the first 64 bits of the 512 bit number "b" are transferred to the multiplier 602 via the multiplier first input port 610. At a clock pulse after the clock pulse in which the first 64 bits of the "b" value was transferred to the multiplier 602, 64 bits of the "a" value for the next multiplication are transferred from the memory 25 to the preload register 604. This is indicated at the pulse 710 on trace 706. The foregoing can also be implemented with pulse 710 occurring two or more cycles after the cycle loading the "b" information as well. This process is repeated until all bits representing "b" have been loaded into the multiplier 602 and all bits representing the new "a" value have been pre-loaded into the preload register 604.

Figure 13:
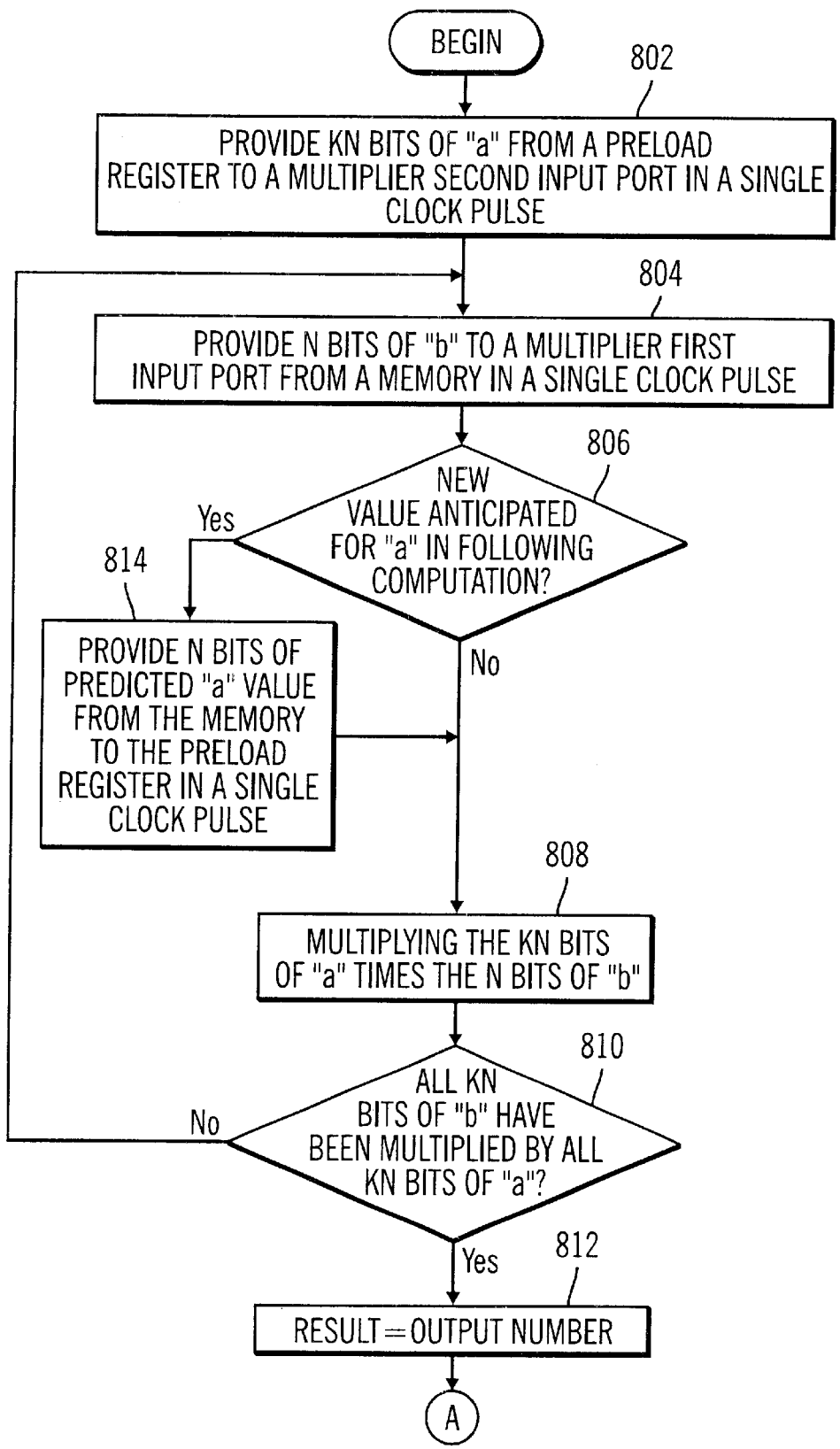
FIGS. 13 and 14 are flow charts depicting the multiplication operations.
Figure 14:
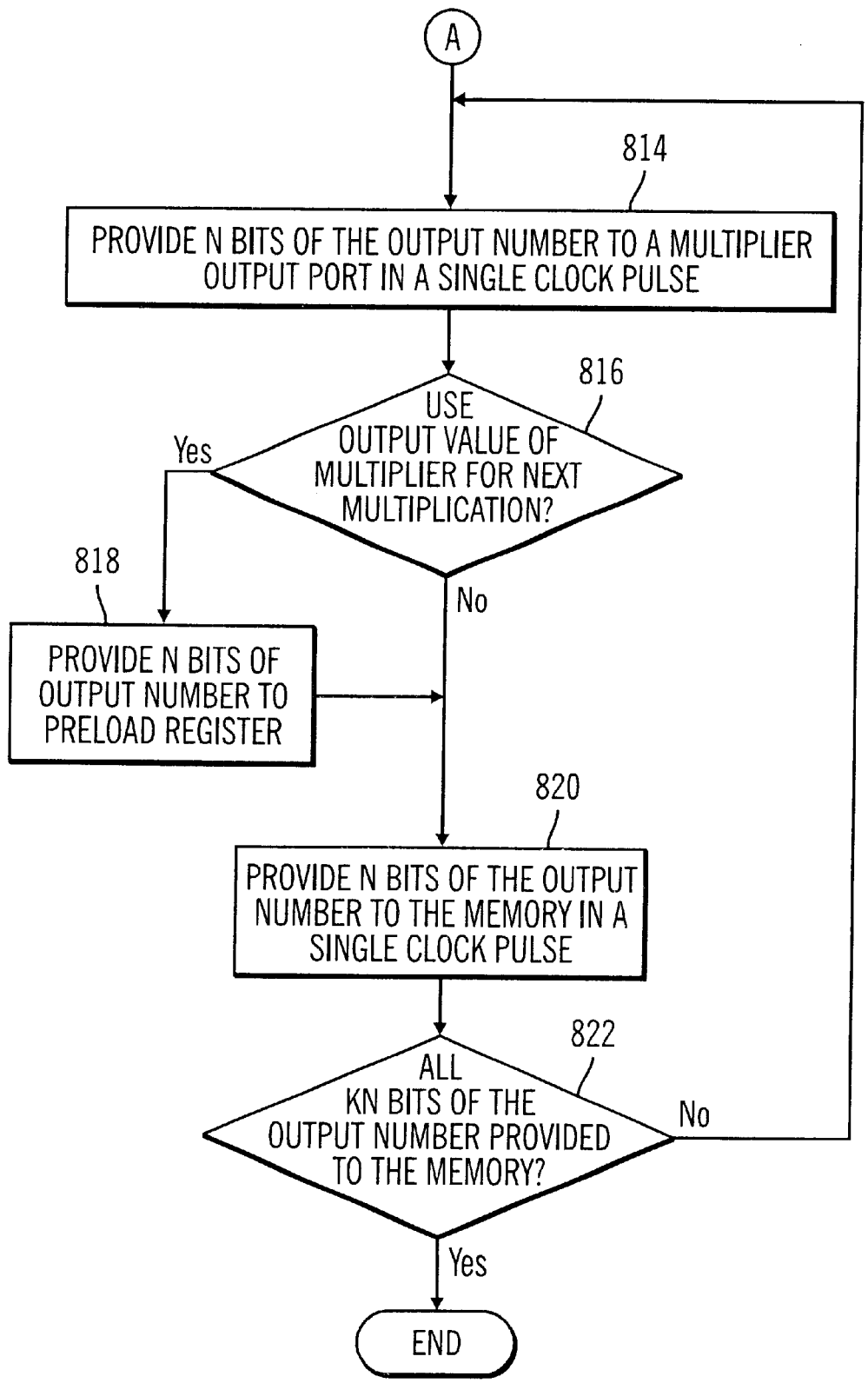

FIGS. 13 and 14 are flow charts depicting the multiplication operations of one embodiment of the present invention. First, as shown in block 802, KN bits of "A" are provided from the preload register 602 to the multiplier 602 in the multiplier second input port 612. This is accomplished in a single clock pulse. Next, N bits of "b" are provided to the first input port 610 of the multiplier 602 in a single clock pulse. This is shown in block 804.

In the Montgomery algorithm, the operand "a" is often used in successive calculations, and can also be predicted from past values. Because of this deterministic nature, the value for "a" for in successive calculations may be predicted. If a new value is predicted for "a" in following computations, N bits of the predicted "a" value is provided from the memory 25 to the preload register 604 in a single clock. This can be performed in a clock pulse following the pulse providing the N bits of "b" to the multiplier, and is depicted in blocks 806 and 814. By providing the predicted "a" value from the memory 25 at this time, a potential bottleneck in data flow for new "a" values is minimized, as described above with reference to FIG. 12. If a new value for "a" is not anticipated, the logic from block 806 proceeds to block 808, where the KN bits of "a" are multiplied by the N bits of "b."

This process is completed until all KN bits of "b" have been multiplied by all KN bits of "a," as illustrated in block 810, resulting in the output number provided in block 812. Then, as shown in block 814, N bits of the output number are provided to the multiplier output port in a single clock pulse. If the current output value from the multiplier 602 is required for the next multiplication, N bits of the output number are provided to the preload register 604. This is illustrated in blocks 816 and 818. If not, logic proceeds to block 820, where the N bits of the output number are provided to the memory 25. As depicted in block 822, the operations performed in blocks 814 through 822 are repeated until all KN bits of the output number are provided to the memory 25.

Using the foregoing techniques, the multiplier 602 is capable of efficiently performing a number of operations on "a" and "b," in addition to multiplication. These operations are described in Table 1 below:

TABLE 1

| Address | Instruction | Control Word Description |
|---|---|---|
| 0000 | a + b | Read value "a" from the memory 25, and add it to an accumulator in the multiplier 602. This can be accomplished by performing the operation [(a * b) + acc] where either "a" or "b" are set to one. |
| 0001 | a * b + acc | Read "a" and "b" from the memory 25 and execute a multiply and accumulate function. The LSB of the result is stored back in the memory 25. All data transfer between the multiplier 602 and the memory 25 |

TABLE 1-continued

| Address | Instruction | Control Word Description |
|---|---|---|
| | | occurs with the LSBs first, with the memory address decremented by one after each memory read or memory write operation. |
| 0010 | a * b + acc | Use previous value of "a," read "b" from memory 25 and execute multiply and accumulate function. The LSBs of the result are stored back in the memory 25. |
| 0011 | Save acc | Store accumulator value in the memory 25, and clear accumulator. |
| 0100 | Save acc and overflow | Store accumulator and overflow in the memory 25. Clear accumulator and overflow. |
| 0110 | ((a * b) *2) + acc | Use previous value of "a," read "b" from the memory 25, and execute multiply and accumulate * 2 function. The LSBs of the result are stored back in the memory 25. |
| 0111 | Clear acc and overflow | Clear the accumulator and overflow. |

CONCLUSION

A computationally efficient multiplication apparatus and method especially well suited to modular exponentiation has been described. The apparatus uses a preload register, coupled to a multiplier via a KN bit bus to load the value of the "a" multiplicand in the multiplier in a single clock pulse. The "b" multiplicand (which is also KN bits long) is supplied to the multiplier N bits at a time from a memory via an N bit bus. The multiplier multiplies the N bits of the "b" multiplicand by the KN bits of the "a" multiplicand until all KN bits of "b" are multiplied by the KN bits of "a."

The method provides KN bits of the multiplicand "a" from a preload register to the multiplier in a single clock pulse. Then, N bits of the multiplicand "b" are provided to the multiplier, also in a single clock pulse. Next, the KN bits of the number "a" are repeatedly multiplied by the N bits of the number b until all of the KN bits of the "b" multiplicand are provided to the first multiplier input port and multiplied by the KN bits of the "a" multiplicand. When completed, these operations result in an output number, which is then transmitted N bits at a time to the memory, where it can be made available for further processing.

In accordance with the deterministic behavior of the Montgomery algorithm, one embodiment of the present invention loads a predicted (future) value for multiplicand "a" into the preload register while multiplication operations on the current "a" and "b" multiplicands are being performed. This technique further reduces the clock cycles necessary to load and multiply the parameters.

It should also be appreciated that various modifications, adaptations, and alternative embodiments of the computationally efficient multiplier may be made within the scope and spirit of the present invention. For example, while the present invention is well suited to cryptographic systems implemented with special purpose processors, it is also useful in non-cyrptographic systems and may be implemented in general purpose processors as well. In such cases, one or more computer-executable programs of instructions implementing the invention may be tangibly embodied in a computer-readable program storage device such as a floppy disk or other storage media.

What is claimed is:

1. In a system for performing modular reduction operations integral to cryptographic key calculations, a method for performing efficient Montgomery multiplication, comprising the steps of:

(a) providing KN bits of an operand A from a preload register to a multiplier in a single clock pulse, where K and N are positive integers and KN is the product of K and N;

(b) providing N bits of an operand B from memory to the multiplier in a single clock pulse, where the operand B is comprised of a total of KN bits;

(c) multiplying the KN bits of the operand A by the N bits of the operand B;

(d) providing N bits of a new predicted value for the operand A from the memory to the preload register in a single clock pulse that is also used to perform the multiplication of step (c), where the new predicted value for the operand A is comprised of a total of KN bits and based on past values of the operand A;

(e) repeating steps (a) through (d) K times until the KN bits of the operand A have been multiplied by the KN bits of the operand B to generate an output number having KN bits, and the KN bits of the new predicted value for the operand A have been provided to the preload register;

(f) providing N bits of the output number to a multiplier output port in a single clock pulse;

(g) providing N bits of the output number to the preload register if the output number is required for a subsequent multiplication;

(h) providing N bits of the output number to memory if the output number is not required for a subsequent multiplication; and (i) repeating steps (f) through (h) until all KN bits of the output number have been provided to memory;

wherein steps (a) through (i) are executed to perform Montgomery routine support operations beneficial for performing Montgomery multiplication in a cryptographic key calculation.

2. In a system for performing modular reduction operations integral to cryptographic key calculations, a computational apparatus for performing efficient Montgomery multiplication, comprising:

a multiplier for multiplying for an operand B representable by N bits and an operand A representable by KN bits to generate an output, wherein K and N are positive integers, the multiplier comprising a first input port for accepting operand A, a second input port for accepting operand B, and an output port;

a memory for storing the output, the memory comprising a memory input port communicatively coupled to the multiplier output port via a first N bit data channel and a memory output port communicatively coupled to the multiplier second input port via a second N bit data channel;

a preload register for accepting and storing operand A, the preload register communicatively coupled to the multiplier first input port via a KN bit data channel; and a control unit configured for directing the multiplier to perform Montgomery routine support operations beneficial for performing Montgomery multiplication, the control unit configured for (a) providing KN bits of an operand A from a preload register to the multiplier in a single clock pulse, (b) providing N bits of an operand B from memory to the multiplier in a single clock pulse, where the operand B is comprised of a total of KN bits, (c) multiplying the KN bits of the operand A by the N bits of the operand B in one or more clock pulses, (d) providing N bits of a new predicted value for the operand A from the memory to the preload register in a single clock pulse that is also used to perform the multiplication of step (c), where the new predicted value for the operand A is comprised of a total of KN bits and based on past values of the operand A, (e) repeating steps (a) through (d) K times until the KN bits of the operand A have been multiplied by the KN bits of the operand B to generate an output number having KN bits, and the KN bits of the new predicted value for the operand A have been provided to the preload register, (f) providing N bits of the output number to a multiplier output port in a single clock pulse, (g) providing N bits of the output number to the preload register if the output number is required for a subsequent multiplication, (h) providing N bits of the output number to memory if the output number is not required for a subsequent multiplication, and (i) repeating steps (f) through (h) until all KN bits of the output number have been provided to memory.

* * * * *